US010929801B1

(12) United States Patent
Bektemirov

(10) Patent No.: US 10,929,801 B1
(45) Date of Patent: Feb. 23, 2021

(54) SYSTEM AND METHOD FOR AUTOMATED BATCH INBOUND TRANSPORTATION APPOINTMENT SETTING FOR RETAILER DISTRIBUTION CENTERS

(71) Applicant: CaseStack, LLC, Santa Monica, CA (US)

(72) Inventor: Kanat Bektemirov, Fayetteville, AR (US)

(73) Assignee: CASESTACK, LLC, Wilmington, DE (US)

( * ) Notice: Subject to any disclaimer, the term of this patent is extended or adjusted under 35 U.S.C. 154(b) by 531 days.

(21) Appl. No.: 15/914,320

(22) Filed: Mar. 7, 2018

(51) Int. Cl.
*G06Q 10/08* (2012.01)
*G06F 16/903* (2019.01)

(52) U.S. Cl.
CPC ..... *G06Q 10/083* (2013.01); *G06F 16/90335* (2019.01)

(58) Field of Classification Search
CPC ........................ G06Q 10/083; G06F 16/90335
See application file for complete search history.

(56) References Cited

U.S. PATENT DOCUMENTS

2006/0200253 A1* 9/2006 Hoffberg ................ H04N 5/782 700/19
2020/0090117 A1* 3/2020 Luo ...................... G06Q 10/083
2020/0175570 A1* 6/2020 Chen ................ G06Q 10/08355

OTHER PUBLICATIONS

Fabian Monrose, "Keystroke dynamics as a biometric for authentication", 1999, p. 1-3 (Year: 1999).*

* cited by examiner

*Primary Examiner* — Kevin H Flynn
*Assistant Examiner* — Ibrahim N El-Bathy
(74) *Attorney, Agent, or Firm* — Quarles & Brady LLP

(57) ABSTRACT

A computerized system and method for scheduling shipping deliveries to one or more retailer locations autonomously, where the system receives a set of data and selects a relevant portion of the set of data that corresponds to the data required by a retailer interface associated with each of the one or more retailer locations, the retailer interfaces having a set of data fields that each require a particular piece of information associated with the shipping delivery. The system and method of the present invention determines a series of mouse clicks and keystrokes necessary to navigate and complete the retailer interface, then uses the determined series of mouse clicks and keystrokes to autonomously schedule shipping deliveries by supplying the relevant portion of the data set to the appropriate data fields on the retailer interface.

4 Claims, 3 Drawing Sheets

SYSTEM AND METHOD FOR AUTOMATED BATCH INBOUND TRANSPORTATION APPOINTMENT SETTING FOR RETAILER DISTRIBUTION CENTERS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Consumer packaged goods (CPG) companies provide products to retailers across the United States. In order for these products to be available to consumers in various stores in different geographic locations, trucks are constantly leaving warehouses—where the products are stored—to bring products to the multitude of retailer distribution centers across the United States. Because of the large number of retail stores that sell a given product, many of these warehouse locations have hundreds of trucks arriving and leaving every day. In order to meet time restrictions for shelving products at their retail locations, each retailer generally sets its own unique standards for when a truck must arrive either at their distribution center or at their retail location. That is, these companies generally require delivery trucks to arrive during a specific time window with the product the retailer has ordered so that the retail store's inventories are always properly stocked.

With thousands of products being shipped to each retailer's distribution center, shippers are generally required to login to a retailer's online portal to notify the retailer when each truck will arrive and to notify the retailer how much product is in the truck. In many cases, if the retailer does not receive this information by a certain deadline, a shipper's truck that arrives at the retail location will be refused and the shipper may be fined for failing to follow the retailer's protocol. Thus, logging into these numerous online portals is currently a requirement. The large amount of information that must be input into these online portals, however, can be time consuming—sometimes requiring hours of labor to fill in hundreds of thousands of lines of information detailing ever single truck and its contents arriving at the distribution centers—a time-consuming and costly task that affects the company's bottom line. An automated system that streamlines the product shipment management process is needed.

BRIEF SUMMARY OF THE INVENTION

Generally speaking, the present invention is directed to an automated system that is useful for managing truck shipment operations, and more particularly to an automated system that utilizes pre-programmed keystrokes and mouse movements to automatically schedule delivery appointments with retailers. It is an object of the present invention to provide a system that generates information and integrates the information into the online portals of retailers in order to ship products from warehouses to retailer distribution centers. It is another object of the present invention to provide a system with built-in adaptive transportation features that allow the system to tailor the generated information respective to each retailer portal in order to significantly decrease time and costs of manually scheduling transportation appointments.

These and other objects, features, and advantages of the present invention will become better understood from a consideration of the following detailed description of the preferred embodiments and appended claims in conjunction with the drawings as described following:

DETAILED DESCRIPTION OF THE INVENTION

Generally speaking, the present invention is directed to an automated system that is useful for managing truck shipment operations, and more particularly to an automated system that utilizes pre-programmed keystrokes and mouse movements to automatically schedule delivery appointments with retailers. It may be seen, then, that upon the mass-input of data relating to shipping operations, the automated system is capable of analyzing the data, separating the data such that only the relevant information corresponding to required data fields of a number of retailer interfaces is selected, and automatically inputting such relevant information into the appropriate data fields of each of the retailer interfaces. To analyze, select, and input the appropriate information, the system of the present invention generally includes a number of components that are in communication with one another and are further in communication with a non-transitory computer readable media storing instructions for execution by the various components. In the preferred embodiment, the instructions are executed at a microprocessor coupled to the readable media. It may be seen that the particular arrangement of these routines and engines executing at the microprocessor, and the particular ordered combination of steps executed by these routines and engines, provides a unique solution for extracting appropriate information associated with shipping orders from a mass-input of information and inputting the information extracted into corresponding appropriate data fields on a variety of unique retailer interfaces. Each of the particular components and the particular steps performed by each component are described more fully below.

Figure 1:
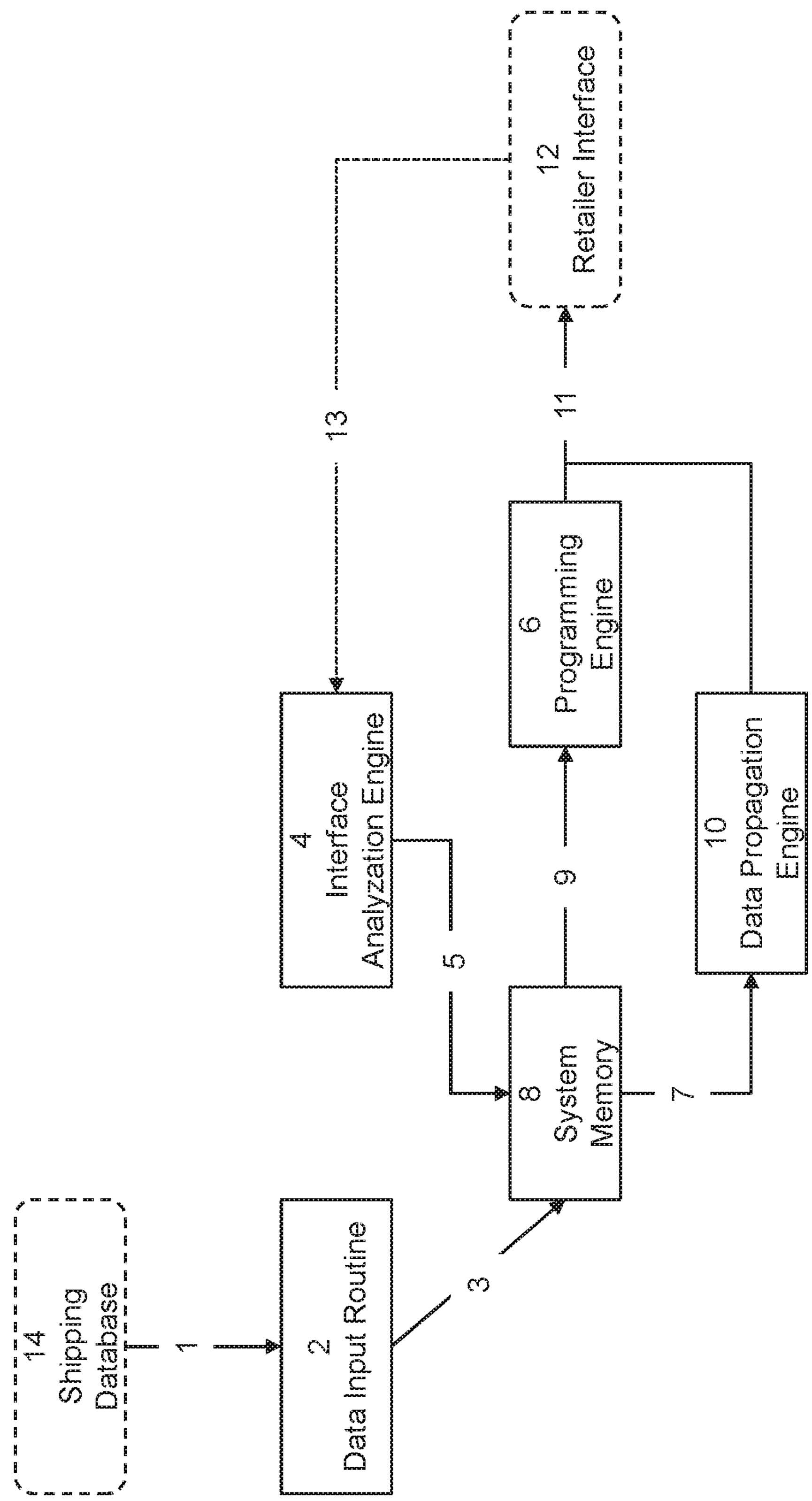
FIG. 1 is a schematic diagram showing the overall system and process of the present invention.

Turning to FIG. 1, the general components and process of the system of the present may be described. As shown, the automated, computerized system of the present invention includes a data input routine 2, an interface analyzation engine 4, a programming engine 6, a system memory 8, and a data propagation engine 10. Each of these components work together to perform a particular series of steps that allow the system to automatically propagate relevant data into corresponding user interface data fields. Generally speaking, the data input routine 2 receives 1 a mass-input of data relating to shipping orders from an external source such as a shipping database 14. The interface analyzation engine's 4 main function is to determine for each retailer interface what shipping order data is necessary to complete any data fields on the interface. The pre-programming engine 6 then, based on the work performed by the data input routine 2 and the retailer interface analyzation engine 4 pre-programs 9 the system with keystrokes and mouse clicks for each retailer interface. The data propagation engine 10 then scans 7 the mass-input of data to select only the relevant data (relevant data being the data necessary to complete the data field requests of the numerous retailer interfaces) and inputs 11 the relevant data into the appropriate data field on the retailer interface using the pre-programmed keystrokes and mouse clicks.

Figure 2:
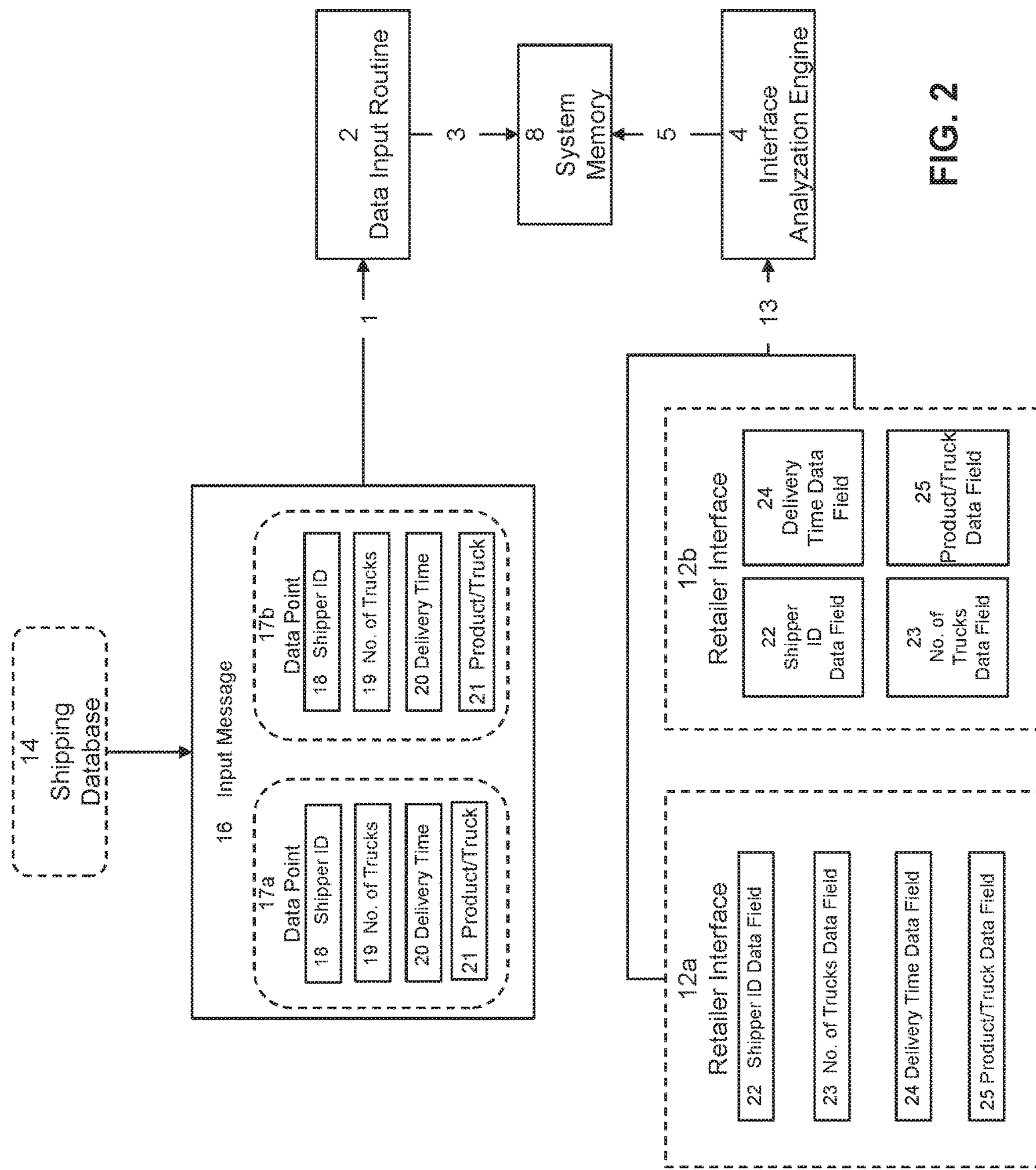
FIG. 2 is a schematic diagram showing the data input routine and the interface analyzation engine of the present invention.

Turning to FIG. 2, the data input routine 2 and interface analyzation engine 4 may be described more fully. The data input routine 2 is in communication with a non-transitory computer readable media storing instructions for execution by the data input routine 2. The data input routine 2 receives one or more input messages 16 containing a bulk set of data 17 having multiple data points 17*a*, 17*b* relating to a shipping operation. The bulk set of data 17 may, for example, be a spreadsheet or database 14 containing information such as shipping order identification 18, shipping operation size 19, shipping order delivery date and time 20, product per truck information 21, and/or other information relating to the one or more shipping orders being shipped as part of the particular shipping operation. FIG. 2, for example, shows data for multiple shipping orders 17*a*, 17*b* which may, for example, be scheduled to be delivered to different retailer locations. As shown, for example, shipping order 17*a* is scheduled to be shipped to a retailer associated with retailer interface 12*a* and shipping order 17*b* is scheduled to be shipped to a retailer associated with retailer interface 12*b*. In one embodiment, the data input routine 2 may be in direct communication with the database 14 containing the bulk data set 17 such that the data input routine 2 constantly receives real-time input messages 16 containing the bulk data 17 as the database 14 is updated. In an alternative embodiment, the bulk data 17 set may be received by the data input routine 2 from a manual upload of an input message 16 by the user of the system. In either embodiment, when the data set 17 is received by the data input routine 2, the data input routine 2 stores the data in a system memory 8. Again, as mentioned above, the data set 17 preferably contains a variety of information about a number of shipping orders 17*a*, 17*b* for a given shipping operation or multiple shipping operations. In particular, the data set 17 includes information providing details such as who is shipping the shipping orders (shipper ID 18), when the shipping orders are to be delivered (delivery time 20), how many trucks are being used in the shipping operation (no. of trucks 19), and how many of the shipping orders being shipped are packed into each of the different trucks being used (product/truck 21). Other information may also be included, such as from where the trucks are coming and to where the trucks are delivering the shipping orders.

Once the data set 17 is received by the data input routine 2 and stored in the system memory 8, the interface analyzation engine 4 carries out instructions for analyzing each of the retail interfaces 12 to determine what data fields are present on the retail interfaces 12. In one embodiment, each of the particular retail interfaces 12 is accessed manually by the user to provide access to the interface analyzation engine 4. For each of the retail interfaces 12, the interface analyzation engine 4 determines how many required data fields are included on the particular interface. The interface analyzation engine also determines what type of required information is associated with each of the identified data fields. For example, as shown in FIG. 2, a particular retailer interface 12*a* may include a number of data fields each requiring specific information about the shipping operation in order for the shipper to do business with the retailer. The data fields may require, for example, the shipper's identification (shipper ID data field 22), the number of shipping trucks to be received at the retailer's facility (no. of trucks data field 23), the number of shipping orders contained in each of the shipping trucks (product/truck data field 25), and the time at which each of the trucks is expected to arrive at the retailer's facility (delivery time data field 24). Each retailer interface may require this particular information (or other similar pieces of information) in order for the retailer to efficiently manage its inventory and product receiving operations. The interface analyzation engine 4 associates each of the data fields with the required information corresponding to the data field and stores the associations in the system memory 8. Once the number of data fields and the type of information necessary to fill each data field is determined, the system is pre-programmed 9 with a number of keystrokes and mouse clicks that allow the system to automatically navigate the retailer interface 12. To do this, the retailer interface 12 layout is analyzed to determine at which location on the interface 12 each of the data fields is positioned. As shown in FIG. 2, for example, different retailer interfaces 12 may require the same type of information, but each particular interface 12 may have a unique layout such that data fields relating to the same information are in a different order on each interface 12. Understanding the order and position of each of the data fields allows the system to use pre-programmed keystrokes and mouse clicks to select the correct data field on the interfaces 12.

Figure 3:
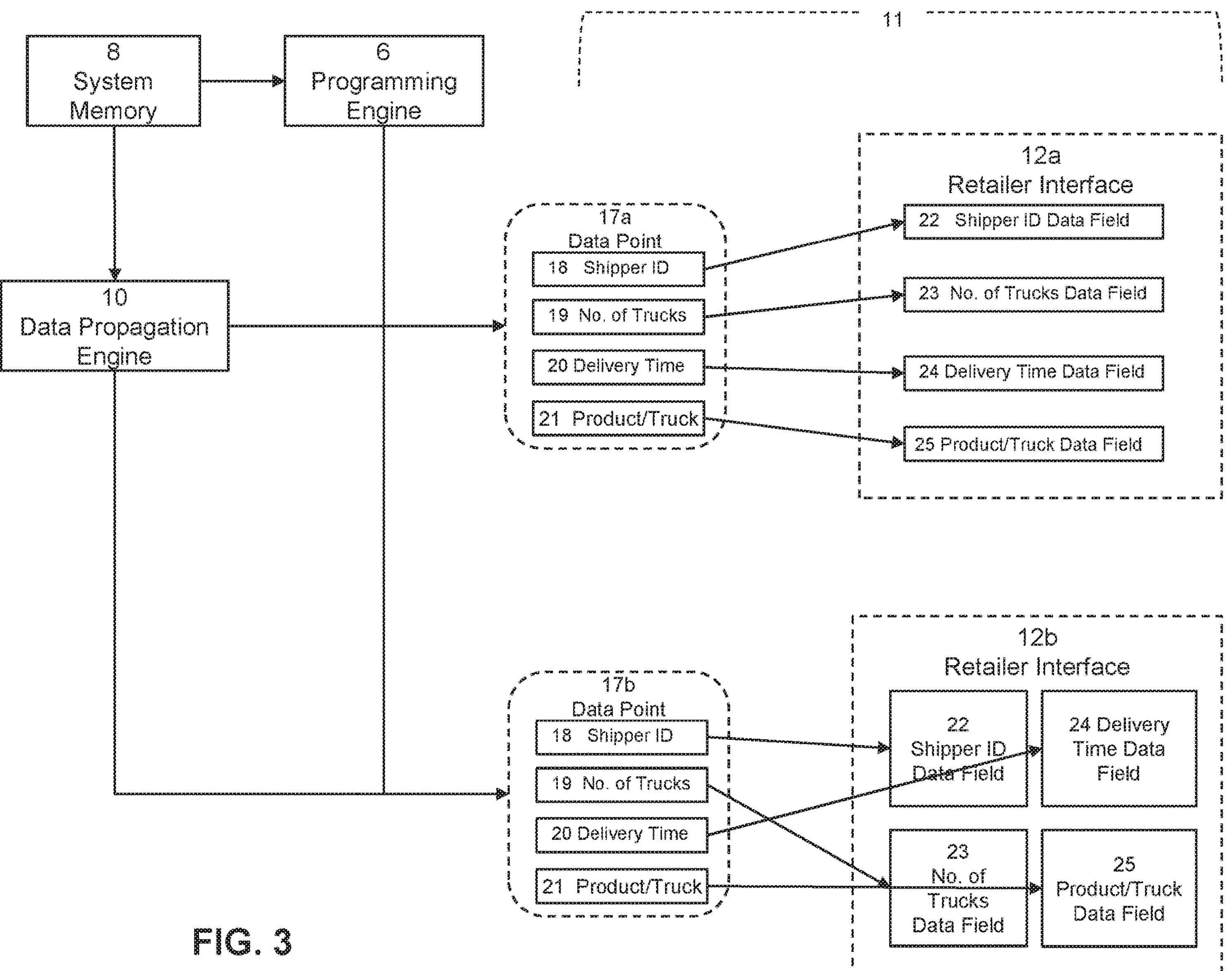
FIG. 3 is a schematic diagram showing the data propagation engine and the programming engine of the present invention.

After the data fields have been identified and the keystrokes and mouse clicks have been programmed, the data propagation engine 10 is called upon to access the saved data information and saved interface information from the system memory 8. First, the data propagation engine 10 receives a request from a particular retailer interface 12 for information. In order to allow for automatic propagation of this particular retailer interface 12, the retailer interface information is recalled from the system memory 8. As mentioned above, this interface information includes information relating to the number, type, and position of data fields on the particular retailer interface. Thus, the data propagation engine 10 may recall for Retailer Interface 12*a* that there are four data fields required: (a) the shipper's identification 22, (b) how many trucks are being used to deliver product to the retailer's facility 23, (c) when each truck is expected to arrive at the retailer's facility 24, and (d) how much product is packed into each of the trucks 25. The data propagation engine 10 then recalls the corresponding input data 17 from the system memory 8. Thus, in the above example, the data propagation engine 10 will recall from the system memory 8 information associated with shipping orders being delivered to Retailer Interface 12*a* (which is the data associated with input message 17*a*): the shipper's identification 18, number of trucks 19, expected delivery time 20, and amount of product 21 for the shipper user 17*a* that corresponds to that particular retailer 12*a*. Because the system has been programmed with keystrokes and mouse clicks and because the system has previously identified the order and location of the data fields on the retailer interface 12*a*, the data propagation engine 10 is capable of automatically inputting the appropriate recalled information into the appropriate data field. Thus, the shipper user's information is input into the retailer interface according to the retailer's receiving protocol automatically. This information can be automatically input for different shipping orders intended to be delivered to retailers associated with different interfaces, as shown in FIG. 3.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. When a Markush group or other grouping is used herein, all individual members of the group and all combinations and subcombinations possible of the group are intended to be individually included. All references cited herein are hereby incorporated by reference to the extent that there is no inconsistency with the disclosure of this specification. When a range is stated herein, the range is intended to include all sub-ranges within the range, as well as all individual points within the range. When "about," "approximately," or like terms are used herein, they are intended to include amounts, measurements, or the like that do not depart significantly from the expressly stated amount, measurement, or the like, such that the stated purpose of the apparatus or process is not lost.

The present invention has been described with reference to certain preferred and alternative embodiments that are intended to be exemplary only and not limiting to the full scope of the present invention, as set forth in the appended claims.

I claim:

1. An integrated system with computerized components for autonomously scheduling a number of shipping deliveries on a number of retailer interfaces, the system comprising:

a. a shipping data input routine executing at a microprocessor coupled to a non-transitory media storing instructions for executing the shipping data input routine, the shipping data input routine configured to:
   i. receive at least one data input message comprising one or more data points relating to at least one shipping operation;
   ii. read from each of the one or more data points a plurality of shipping information records; and
   iii. store the plurality of shipping information records in a system memory in communication with the shipping data input routine;

b. an interface analyzation engine executing at the microprocessor coupled to the non-transitory media storing instructions for executing the interface analyzation engine, the interface analyzation engine configured to access one or more retailer interfaces having a number of input data fields, and for each of the one or more retailer interfaces;
   i. determine the number of input data fields on the particular retailer interface;
   ii. determine particular information requested by each of the number of input data fields on the particular retailer interface;
   iii. determine g position of each of the number of input data fields on the particular retailer interface; and
   iv. store the number of input data fields, information requested by each of the number of input data fields, and the position of each of the number of input data fields in the system memory;

c. a programming engine executing at the microprocessor coupled to the non-transitory media storing instructions for executing the programming engine, the programming engine configured for each of the one or more retailer interfaces learn a series of one or more mouse clicks and keystrokes necessary to navigate the particular retailer interface and supply information to each of the number of input data fields on the particular retailer interface; and d. a propagation engine executing at the microprocessor coupled to the non-transitory media storing instructions for executing the propagation engine, the propagation engine configured for each of the one or more retailer interfaces:
   i. receive a request from the particular retailer interface to complete the number of data fields on the particular retailer interface with information corresponding to a particular shipping order to be delivered to a retailer associated with the particular retailer interface;
   ii. recall from the system memory the plurality of shipping information records associated with the particular shipping order to be delivered to the retailer associated with the particular retailer interface;
   iii. recall from the system memory the number of input data fields, information requested by each of the number of input data fields, and the position of each of the number of input data fields associated with the particular retailer interface; and
   iv. using the series of one or more mouse clicks and keystrokes known by the programming engine and corresponding to the particular retailer interface, input each of the plurality of shipping information records into corresponding fields of the number of input data fields on the retailer interface.

2. The system of claim 1, wherein the plurality of shipping information records comprise a shipper identification record, a shipment truck amount record, a shipment delivery date record, and a product per shipment truck record.

3. The system of claim 1, further comprising a shipping database in communication with the data input routine, wherein the data input routine is configured to automatically receive the at least one data input message directly from the shipping database.

4. A computerized method for autonomously scheduling a number of shipping deliveries to one or more retailers, the method comprising:

a. receiving, at a processor, at least one data input message comprising one or more data points relating to at least one of the number of shipping deliveries;

b. reading, by the processor, from each of the one or more data points a plurality of shipping information records associated with the at least one of the number of shipping deliveries;

c. accessing, by the processor, one or more retailer interfaces for each of the one or more retailers, wherein each of the one or more retailer interfaces comprises a number of input data fields;

d. for each of the one or more retailer interfaces, determining, by the processor, the number of input data fields on the particular retailer interface;

e. for each of the one or more retailer interfaces, determining, by the processor, a particular piece of information requested by each of the number of input data fields on the particular retailer interface;

f. for each of the one or more retailer interfaces, determining, by the processor, a position of each of the number of input data fields on the particular retailer interface;

g. for each of the one or more retailer interfaces, developing, by the processor, a series of one or more mouse clicks and keystrokes necessary to navigate the particular retailer interface and supply information to each of the number of input data fields on the particular retailer interface; and h. using, by the processor, the series of one or more mouse clicks and keystrokes to input each of the plurality of shipping information records into corresponding fields of the number of input data fields on the retailer interface.

* * * * *